United States Patent
Wegner et al.

(10) Patent No.: US 9,595,716 B2
(45) Date of Patent: Mar. 14, 2017

(54) ELECTRODE AND METHOD FOR MANUFACTURING AN ELECTRODE

(71) Applicant: Robert Bosch GmbH, Stuttgart (DE)

(72) Inventors: Marcus Wegner, Leonberg (DE); Jens Grimminger, Leonberg (DE); Martin Tenzer, Unterensingen (DE); Jean Fanous, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 380 days.

(21) Appl. No.: 14/020,310

(22) Filed: Sep. 6, 2013

(65) Prior Publication Data

US 2014/0072698 A1 Mar. 13, 2014

(30) Foreign Application Priority Data

Sep. 7, 2012 (DE) .................. 10 2012 215 878

(51) Int. Cl.
| | |
|---|---|
| H01M 4/62 | (2006.01) |
| H01M 4/04 | (2006.01) |
| H01M 4/13 | (2010.01) |
| H01M 4/139 | (2010.01) |
| H01G 11/30 | (2013.01) |
| H01M 4/38 | (2006.01) |

(52) U.S. Cl.
CPC .............. *H01M 4/62* (2013.01); *H01G 11/30* (2013.01); *H01M 4/0404* (2013.01); *H01M 4/13* (2013.01); *H01M 4/139* (2013.01); *H01M 4/38* (2013.01); *H01M 4/382* (2013.01); *Y02E 60/122* (2013.01); *Y02E 60/13* (2013.01); *Y02P 70/54* (2015.11)

(58) Field of Classification Search
None
See application file for complete search history.

(56) References Cited

U.S. PATENT DOCUMENTS

| | | | |
|---|---|---|---|
| 2003/0168627 A1* | 9/2003 | Singh ..................... | C09G 1/02 252/79.1 |
| 2004/0009396 A1* | 1/2004 | Kim ..................... | H01M 4/136 429/212 |
| 2009/0208840 A1* | 8/2009 | Ogasawara et al. ......... | 429/207 |
| 2010/0216027 A1* | 8/2010 | Fujii ............................. | 429/246 |
| 2011/0165466 A1* | 7/2011 | Zhamu et al. ............. | 429/231.8 |
| 2012/0237828 A1* | 9/2012 | Tan et al. ..................... | 429/221 |

FOREIGN PATENT DOCUMENTS

| | | | | |
|---|---|---|---|---|
| FR | 2324588 | * | 4/1977 | ............ C04B 21/00 |
| JP | 2001-283848 | * | 10/2001 | ............ H01M 4/58 |

* cited by examiner

*Primary Examiner* — Miriam Stagg
*Assistant Examiner* — Carmen Lyles-Irving
(74) *Attorney, Agent, or Firm* — Gerard Messina

(57) ABSTRACT

An electrode for an energy store, in particular for a lithium-ion battery. To achieve a particularly good and long-term stable capacitance, the electrode includes an active material, optionally a binder, optionally a conductive additive, and a sorption agent; intermediate stages of the active material arising during a charging and/or discharging procedure of the energy store may be immobilized by the sorption agent. Furthermore, also described is a method for manufacturing an electrode for an energy store, and the use of a sorption agent for manufacturing an electrode for an electrochemical energy store.

10 Claims, 3 Drawing Sheets

ELECTRODE AND METHOD FOR MANUFACTURING AN ELECTRODE

FIELD OF THE INVENTION

The present invention relates to an electrode for a lithium-based energy store, in particular for a lithium-metal battery or a lithium-ion battery. Furthermore, the present invention relates to a method for manufacturing such an electrode and to an electrochemical energy store, in particular a lithium-ion battery.

BACKGROUND INFORMATION

It is no longer possible to imagine daily life without lithium-ion batteries. They are used in manifold applications, for example, laptops, mobile telephones, smart phones, or other applications. In the case of the electrification of automobiles, which is presently being strongly promoted, such batteries also play a large role. Presently used lithium-ion batteries often have an energy content which only permits limited ranges, for example, less than 200 km, at acceptable battery weight. A promising approach for an improvement of the range, for example, is lithium-sulfur technology. Known lithium-sulfur cells may deliver energy densities of 350 W h/kg, for example, which may be substantially greater than conventional cells (200 W h/kg). However, lithium-sulfur cells often only display a service life of approximately 100 full cycles.

Although lithium-sulfur batteries therefore offer many advantages, potential for improvement nonetheless still exists.

SUMMARY

An object of the present invention is an electrode for an energy store, in particular for a lithium-based energy store, including an active material, optionally a binder, optionally a conductive additive, and a sorption agent; intermediate stages of the active material, which occur during a charging and/or discharging procedure of the energy store, may be immobilized by the sorption agent.

A lithium-based energy store may be understood within the scope of the present invention in particular as a battery which is at least partially based on lithium, and which uses lithium or lithium ions during the electrochemical process of its charging or discharging cycle. Furthermore, the term battery may be understood in particular to be a primary cell or also a secondary cell, i.e., in particular a rechargeable accumulator. A lithium-based energy store includes, for example, lithium batteries and also lithium-ion batteries. Lithium batteries may conventionally include, to delimit them from lithium-ion batteries, an anode made of metallic lithium or a metallic lithium alloy. In contrast, lithium-ion batteries may include in particular an anode, made of graphite, for example, in which lithium ions may be intercalated.

An active material may be understood in particular within the meaning of the present invention in a way known per se as a material which is subjected to an electrochemical reaction during a charging and/or discharging procedure of the energy store. The active material may include one component or a suitable mixture of a plurality of components.

An intermediate stage of the active material may furthermore be understood within the meaning of the present invention as a species, which, originating from the active material, may occur during a charging and/or discharging procedure of an energy store equipped with an above-described electrode. Therefore, an intermediate stage does not have to exist permanently in the energy store, but rather may only exist temporarily or only in a spatially limited way, and may be formed from the active material or converted into the active material.

A sorption agent may be understood within the meaning of the present invention in particular as a material which has an affinity to an intermediate stage of the active material and may bind it to itself, in particular selectively, for example, sorb it, for example, absorb it, or may immobilize it. Immobilization may mean in particular that the intermediate stages are fixed at least for a limited period of time.

In the case of an above-described electrode for an energy store, in particular in the case of a cathode for a lithium-ion battery, the capacitance of an energy store equipped with such an electrode may be particularly high due to good utilization of the active material. Furthermore, the capacitance may be particularly long-lived, or may be maintained particularly permanently over many charging and/or discharging cycles, since no or only a very limited quantity of active material is lost during the operation.

Such an electrode includes, in a way known per se, an active material as an active species. The active material may be provided in a binder, optionally together with one or multiple conductive additives. The active material, optionally together with the binder and the conductive additive or additives, may be provided on a current collector, for example, a metal foil, for example, an aluminum foil. Suitable binders include, for example, polyvinyl alcohol (PVA), polyvinylidene fluoride (PVDF), polyvinylidene hexafluoropropylene (PVDF-HFP), polytetrafluoroethylene (PTFE), polyethylene oxide (PEO), carboxy methylcellulose (CMC), or styrene butadiene rubber (SBR), while in contrast suitable conductive additives may include carbon compounds, for example, carbon black or graphite. For the case of a lithium-sulfur battery, for example, the active material may be in particular a sulfurous active material, for example, elementary sulfur.

In addition, an electrode furnished as described above includes a sorption agent, in particular an adsorption agent; intermediate stages of the active material arising during a charging and/or discharging procedure may be selectively immobilized by the sorption agent. The active material and the sorption agent are accordingly adapted to one another or selected as a function of one another in such a way that intermediate stages of the active material arising during a charging and/or discharging procedure of the energy store may be selectively immobilized by the sorption agent and may remain in the area thereof.

Due to the provision of such a sorption agent, intermediate stages of the active material, which arise during a charging and/or discharging procedure, may therefore be effectively bound to the sorption agent, in particular adsorbed, and therefore remain on the sorption agent and therefore in the area of the electrode, in particular in the area of the cathode, essentially during the entire operation of an energy store equipped with such an electrode. Intermediate stages may therefore be prevented from being dissolved in the electrolyte, migrating away from the electrode, and therefore possibly remaining at other points of the energy store and thus being lost as a capacitance-founding material. The utilization of the active material may thus be significantly improved, which may significantly increase the capacitance. In addition, the capacitance may have particularly good long-term stability because the active material, even after long operation of the energy store, is not lost by diffusing of the intermediate stages away to the complementary electrode or into electrochemically inactive areas of the energy store. Such an electrode may also prevent intermediate stages from reacting at the complementary electrode and being lost in this way, and also may negatively influence the operation of the energy store.

Within the scope of one embodiment, the sorption agent may selectively immobilize polysulfides, in particular adsorb them. Such an electrode may therefore be suitable in particular for lithium-sulfur batteries, which have polysulfide as intermediate stages arising during a charging and/or discharging procedure.

In detail, sulfur from the active material of a cathode for a lithium-sulfur battery reacts, for example, via multiple intermediate stages of various polysulfides to form the sulfide or is reduced thereto. Such polysulfide intermediate stages are mostly soluble in an electrolyte provided in the energy store, because of which the polysulfides may diffuse toward the anode and react there with the metallic lithium to form lithium sulfide, which precipitates on the anode. The active material may thus be incompletely utilized or irreversibly lost and may no longer be available for an electrochemical reaction. The good solubility may also reduce or prevent complete charging of the cell. Furthermore, longer-chain polysulfides may be reduced on the anode to form shorter-chain polysulfides. These may then migrate back to the cathode and be oxidized there to again form longer-chain polysulfides. These may then migrate to the anode again. If such a shuttle mechanism is excessively rapid, it is no longer possible to oxidize the sulfides to form elementary sulfur. This effect may also be effectively prevented in this embodiment.

A particularly advantageous and complete sulfur utilization may thus be implementable in particular in this embodiment, which may increase the capacitance and may improve the durability of the capacitance of a lithium-sulfur battery.

Within the scope of another embodiment, the sorption agent may have a multilayer structure or multi-ply structure, in particular the sorption agent may have a core having a sorption ply situated thereon. In this embodiment, the sorption agent may be adapted particularly well to the species to be immobilized and to further desired properties. In detail, for example, the core of the sorption agent may specify a suitable size or shape and geometry and also porosity. The sorption ply or sorption layer may be designed particularly advantageously for an interaction with a material to be immobilized. Furthermore, because the sorption ply is provided situated on a core, the properties of the sorption ply may be custom tailored to the actual immobilization, without having to meet requirements with respect to strength, size, and/or stability, however, since these may be assumed essentially completely by the core. Therefore, it is apparent that a particularly application-related and thus particularly effective sorption agent may be provided by tailor-making individual plies or the properties of the plies. In addition, further tailoring may be achieved in this embodiment in that a suitable number of plies is provided; each of the plies may have a certain property, or may be used for a certain property of the sorption agent. A core may be understood within the meaning of the present invention in particular as a ply on which the sorption ply is situated, or on which the sorption ply is fastened or applied. The sorption ply is to be anchored solidly on the surface of the core, for example, or fundamentally on the ply situated under the sorption ply. The sorption ply may thus be prevented from detaching during later operation of the energy store, or the polymer molecules may be prevented from being dissolved by the electrolyte, for example.

Within the scope of another embodiment, the sorption agent, in particular the sorption ply, may have a polymer or may be formed thereof, for example, may be composed thereof, the polymer in particular being selected from the group including polyethers, for example, polyethylene glycols, polyacrylates, polystyrenes, polyvinyl styrenes, polyvinyl alcohols, polysiloxanes, polyesters, or of derivatives or mixtures of the above-mentioned materials, this list not being restrictive. The similar oligomers or monomers may also be bound. In particular, polymers may be suitable, for example, due to hydrophobic or hydrophilic or other interactions by way of manifold functional groups, for the purpose of interacting or immobilizing a large quantity of intermediate stages. Furthermore, polymers may be tailor-made in a particularly simple way, so that here by suitable introduction of greatly varying functional groups, for example, quaternary ammonium groups, a milieu may be created, which may be particularly suitable for the individual species to be immobilized. In addition, different properties may be produced in different areas of the polymers, so that manifold different species may also be able to be immobilized securely and in a large quantity. In particular polymers which have a long chain length may provide surroundings in which species may be enclosed in a targeted way, so that anchoring may also be particularly advantageous and effective here. The polymers are to be solidly anchored or solidly chemically bonded to the ply situated underneath. Furthermore, the polymers may be cross-linked and/or modified in the end groups, in particular to be able to produce suitable properties.

The above-mentioned materials, in particular the above-mentioned polymers of the sorption ply, may be used particularly effectively for the purpose of adsorbing polysulfides as active material intermediate stages. Such materials are therefore suitable in particular in the case of sulfurous active materials or in the case of lithium-sulfur batteries.

Within the scope of another embodiment, the core may have a material or may be formed therefrom, in particular may be composed thereof, the material being selected from a nonrestrictive group including silicon dioxide ($SiO_2$), aluminum oxide ($Al_2O_3$), titanium dioxide ($TiO_2$), zirconium dioxide ($ZrO_2$), silica gel, magnesium oxide (MgO), zinc oxide (ZnO), electrically conductive carbon compounds, for example, active carbon, carbon nanotubes, or mixtures of one or multiple of the above-mentioned materials. Such ceramic materials, for example, may be adapted or tailor-made particularly simply for the desired area of application, for example, by suitable syntheses, for example, template syntheses. For example, size, shape, and/or pore size may be set as desired. In addition, such materials are particularly stable, because of which they may also be used without problems and in a particularly stable way in the case of the conditions occurring during the operation of an energy store. Furthermore, they are chemically inert, so that they do not negatively influence the operation of the energy store. With respect to a core made of electrically conductive materials, one advantage may be that an electrical contact may be established to the conductive additives. The active materials, for example, the polysulfides, may therefore also be reduced or oxidized on the core.

Within the scope of another embodiment, the core may be porous, in particular the core may have a pore volume in a range from greater than or equal to 0.025 $cm^3$/g to less than or equal to 3.0 cm$^3$/g, in particular in the range from greater than or equal to 0.1 cm$^3$/g to less than or equal to 2.0 cm$^3$/g. The surface area may be enlarged overall by a porous core and the sorption ply or individual areas of the sorption ply may be situated at least partially in the pores, whereby sorption agents, for example, polymers, are also situated in the pores on the inner surface. The materials to be immobilized may thus also enter the pores, whereby capturing or immobilization of the species to be immobilized, such as in particular the active material intermediate stages, may also be particularly effective for a large quantity due to additional sorption in the pores.

Therefore, in this embodiment, particularly secure and effective capturing of the intermediate stages may be achieved, which may permit the long-term capacitance to become particularly high in this embodiment. In this embodiment, in particular pore sizes may be provided in a range from greater than or equal to 0.5 nm. For example, the pore sizes may also advantageously be in a range of less than or equal to 500 nm, in particular less than or equal to 100 nm, for example, less than or equal to 60 nm, to be able to securely and effectively capture polysulfides as active material intermediate stages arising during a charging and/or discharging procedure, for example. All pores may have pore sizes in the predetermined ranges, or also in the case of an uneven pore distribution, 90% of the provided pores, for example, may have these sizes.

Within the scope of another embodiment, a carbon layer may be situated between the core and the sorption ply. By providing an electrically conductive carbon layer in particular, the active material intermediate stages may remain captured by the sorption ply at the electrode, on the one hand, but in addition may also have a good contact with the current collector or with the conductive additive. Particularly good current carrying capacity of such an electrode may thus be produced. Furthermore, an electrical contact with the sorption agent may be established via the conductive medium in the cathode, for example, carbon black or graphite. The polysulfides may thus be reduced or oxidized directly at the core. In this embodiment, the core may thus be coated using a plastic ply as the sorption ply.

Reference is hereby explicitly made to the explanations in conjunction with the energy store according to the present invention, the method for manufacturing an electrode, the use, the figures, and the description of the figures with respect to further technical features and advantages of the electrodes according to the present invention.

The object of the present invention is also an energy store, in particular a lithium-sulfur battery, including at least one electrode which is designed as described above. Such an energy store has in particular a high and particularly long-term stable capacitance. The advantages with respect to the capacitance may be founded in particular in that the intermediate stages of the active material, which may arise during a charging and/or discharging procedure of the energy store, may be immobilized securely and effectively at the electrode, and may not get lost by diffusing away toward electrochemically inactive areas of the energy store or due to a reaction at the complementary electrode.

Reference is hereby explicitly made to the explanations in conjunction with the electrode according to the present invention, the method for manufacturing an electrode, the use, the figures, and the description of the figures with respect to further technical features and advantages of the energy store according to the present invention.

The object of the present invention is also a method for manufacturing an electrode for an energy store, in particular a cathode for a lithium-sulfur battery, including the following method steps:
 a) providing a mixture of an active material, a sorption agent, optionally a binder, optionally a suspension agent and/or solvent, and optionally a conductive additive; intermediate stages which arise during a charging and/or discharging procedure of the energy store may be immobilized by the sorption agent;
 b) applying the mixture to a current collector; and
 c) optionally drying the mixture applied to the current collector.

An electrode for an energy store, which may have a particularly high and long-term stable capacitance, may be manufactured in a particularly simple and cost-effective way by such a method.

In detail, in method step a), a mixture may initially be provided in a way known per se, which has the active material and optionally a binder, for example, polyvinylidene fluoride (PVDF) and/or optionally a conductive additive, for example, graphite or carbon black, for example, having a suspension agent/solvent, for example, N-methyl-2-pyrrolidone (NMP). In addition to the above-mentioned components, the mixture may also have a sorption agent; intermediate stages arising during a charging and/or discharging procedure of the energy store may be immobilized by the sorption agent, in particular selectively. According to method step b), such a mixture may be applied to a current conductor, for example, by a coating knife, in a way which is also known per se. Finally, according to method step c), the mixture applied to the current conductor may be dried, for example, to remove a present solvent.

In this way, a stable electrode may be obtained, which includes the active material, optionally the binder and the conductive additive, and in particular the sorption agent. Such an electrode may have the advantage in particular, as already explained above, that intermediate stages of the active material arising during a charging and/or discharging procedure may not diffuse away from the electrode into electrochemically inactive areas of the energy store or react at the complementary electrode, or this is at least significantly reduced, but rather these intermediate stages remain in the area of the desired electrode and therefore the capacitance originating from these intermediate stages is not lost.

Reference is hereby explicitly made to the explanations in conjunction with the electrode according to the present invention, the energy store according to the present invention, the use, the figures, and the description of the figures with respect to further technical features and advantages of the method according to the present invention for manufacturing an electrode.

The object of the present invention is also the use of a sorption agent for manufacturing an electrode for an electrochemical energy store, in particular for manufacturing an electrode for a lithium-sulfur battery, the sorption agent immobilizing intermediate stages arising during a charging and/or discharging procedure of the energy store, in particular the sorption agent having a multilayer structure, having a core and a sorption ply, in particular an adsorption ply.

In particular, by using a sorption agent, the sorption agent selectively immobilizing or in particular adsorbing intermediate stages arising during a charging and/or discharging procedure of the energy store, it may effectively be prevented that intermediate stages of the active material, which arise during a charging and/or discharging procedure, diffuse away from the electrode into electrochemically inactive areas of the energy store or react at the complementary electrode. Rather, these species remain in the area of the desired electrode, whereby the capacitance originating from these intermediate stages is not lost. Therefore, due to the introduction of such a sorption agent into an electrode of an energy store, in particular into an electrode for a lithium-sulfur battery, the capacitance may be designed in a suitable way or to be particularly long-term stable.

Reference is hereby explicitly made to the explanations in conjunction with the electrode according to the present invention, the method according to the present invention for manufacturing an electrode, the energy store according to the present invention, the figures, and the description of the figures with respect to further technical features and advantages of the use according to the present invention.

DETAILED DESCRIPTION

Figure 1:
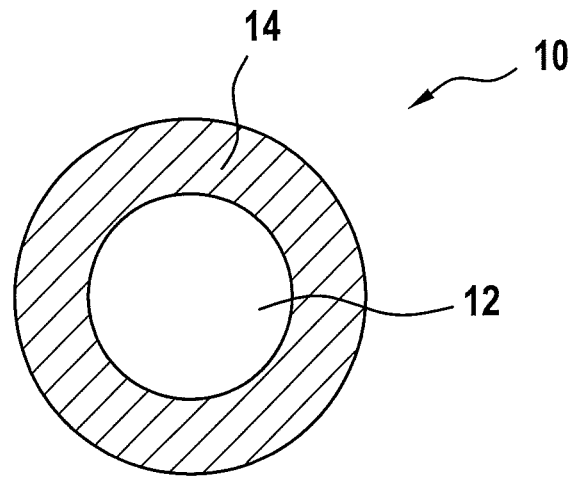
FIG. 1 shows a schematic view of one specific embodiment of a sorption agent for an electrode of an energy store according to the present invention.

FIG. 1 shows one specific embodiment of a sorption agent 10 for an electrode according to the present invention or for an electrochemical energy store according to the present invention. Such an energy store may be used, for example, as a battery, in particular for portable computers, such as laptops or PDAs, mobile telephones, and other consumer application. Other areas of application include, for example, power tools, gardening tools, and electrically driven vehicles, for example, hybrid vehicles or plug-in hybrid vehicles or completely electrically driven vehicles.

Such an electrochemical energy store may be in particular a lithium-based energy store, such as in particular a lithium-metal battery or a lithium-ion battery, for example, a lithium-sulfur battery. It includes an electrode, which is furnished as described hereafter.

The electrode includes an active material, optionally a binder, optionally a conductive additive, and also sorption agent 10. Sorption agent 10 selectively immobilizes or in particular adsorbs intermediate stages of the active material arising during a charging and/or discharging procedure of the energy store, in particular polysulfides, and is also schematically shown in FIGS. 1, 2, and 3.

FIG. 1 shows one specific embodiment of sorption agent 10. Sorption agent 10 may be designed in particular as a solid and may be present in the form of particles or may be used for manufacturing the electrode. The sorption agent may, as is apparent in FIG. 1, have a multilayer structure or a multi-ply structure. Sorption agent 10 may have a core 12 having sorption ply 14 situated thereon. Core 12 may have, for example, a thickness or a particle size in a range from greater than or equal to 1 nm to less than or equal to 30 µm, for example, 5 nm. Sorption ply 14 may be formed from a polymer or may include this polymer or may be composed of this polymer. For example, sorption ply 14 may include a polymer which is selected from the group composed of polyethers, for example, polyethylene glycols, polyacrylates, polystyrenes, polyvinyl styrenes, polyvinyl alcohols, polysiloxanes, polyesters, or derivatives or mixtures of the above-mentioned materials. Furthermore, core 12 may be formed from or include or be composed of a material selected from the group composed of silicon dioxide, aluminum dioxide, titanium dioxide, or zirconium dioxide, silica gel, magnesium oxide, zinc oxide, or electrically conductive carbon compounds, for example, active carbon or carbon nanotubes. Furthermore, core 12 may be nonporous or porous, silica gel being a particularly suitable material for a porous embodiment. For example, core 12 may have a pore volume in a range from greater than or equal to 0.025 $cm^3/g$ to less than or equal to 3.0 $cm^3/g$.

Figure 3:
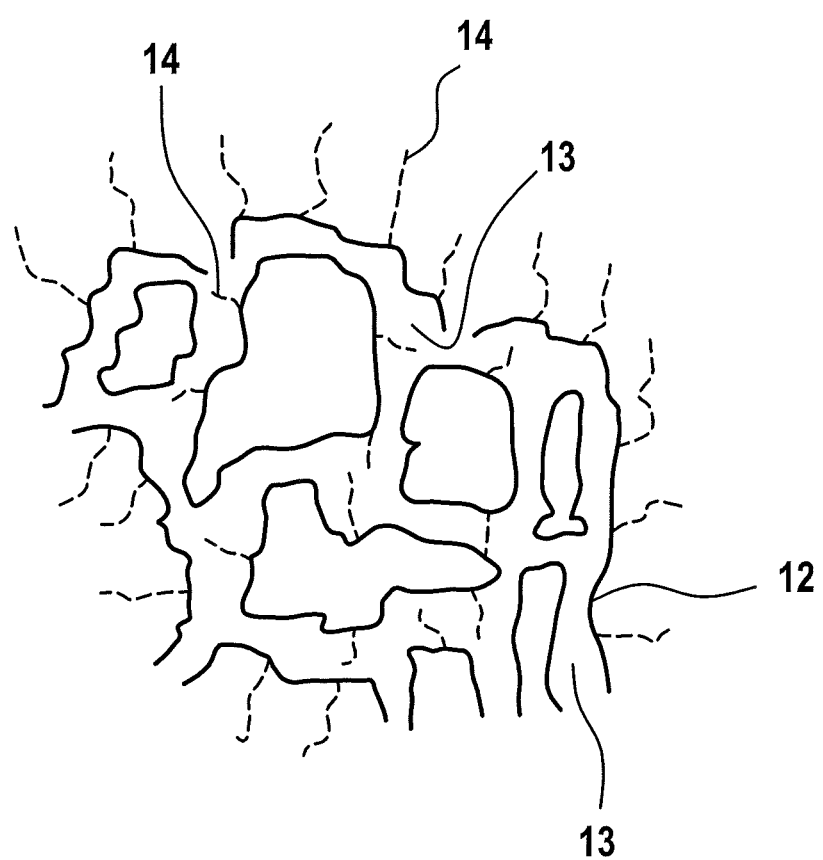
FIG. 3 shows a schematic view of another specific embodiment of a sorption agent for an electrode of an energy store according to the present invention.

One embodiment having a porous core is shown solely schematically in FIG. 3. It is apparent in FIG. 3 that core 12 has pores 13, within which sorption ply 14 is situated, illustrated as polymer strands (not restrictive). It is therefore apparent that a particularly large quantity of intermediate stages of the active material may be sorbed here. The corresponding materials of the particular components may correspond to those mentioned above.

Figure 2:
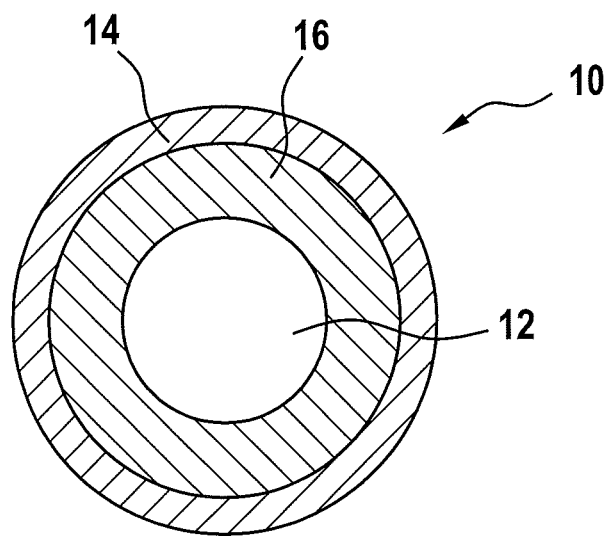
FIG. 2 shows a schematic view of another specific embodiment of a sorption agent for an electrode of an energy store according to the present invention.

Another embodiment of a sorption agent 10 is shown in FIG. 2. It may be essentially identical to sorption agent 10 shown in FIG. 1, so that the above-described features may be transferable to this embodiment. For example, according to FIG. 2, and also according to FIG. 1, a nonporous or also a porous core 12 may be provided. However, in FIG. 2, a ply 16 made of a carbonaceous material, in particular made of an electrically conductive carbonaceous material, is situated in FIG. 2 between core 12 and sorption ply 14.

Such sorption agents 10 may be used, as described, for manufacturing an electrode for an electrochemical energy store, in particular for manufacturing an electrode for a lithium-sulfur battery. Sorption agent 10 selectively immobilizes intermediate stages arising during a charging and/or discharging procedure of the energy store.

A method for manufacturing such an electrode may include the following method steps:
a) providing a mixture of an active material, a sorption agent, optionally a binder, optionally a suspension agent and/or solvent, and optionally a conductive additive; intermediate stages which arise during a charging and/or discharging procedure of the energy store may be immobilized by the sorption agent;
b) applying the mixture to a current collector; and
c) optionally drying the mixture applied to the current collector.

Furthermore, a suitable electrolyte, for example, cyclic or acyclic ethers having lithium-bis-(trifluoromethyl sulfonyl) imide (LiTFSI) as a conductive salt and a suitable anode, for example, a metallic lithium anode, for the case of a lithium-sulfur battery, may be used for manufacturing the energy store.

Figure 4:
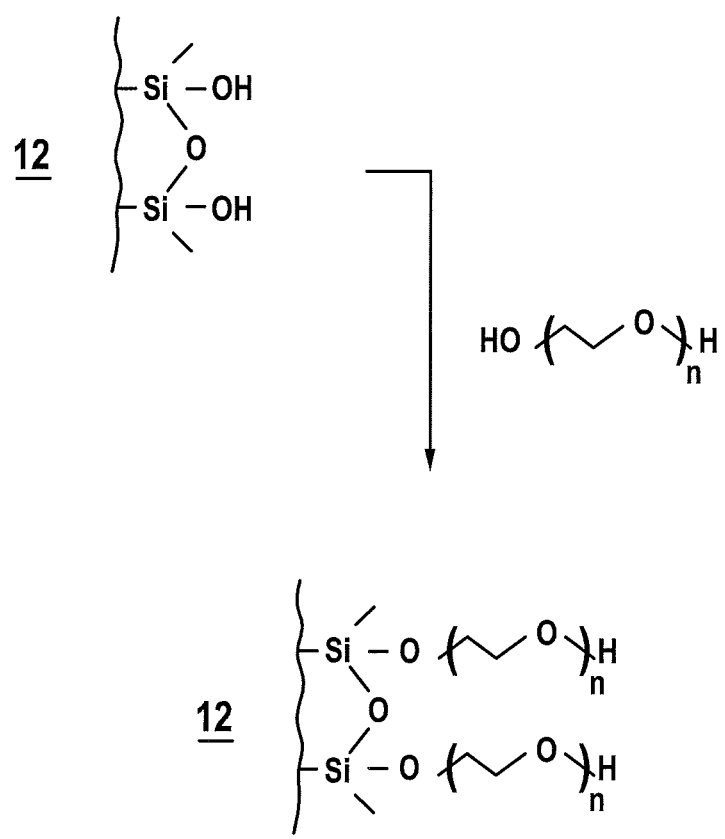
FIG. 4 shows a schematic view of a manufacture of a sorption agent for an electrode of an energy store according to the present invention.

FIG. 4 shows a step of a manufacturing method for an electrode according to the present invention. In detail, a linkage of a silica gel surface to a hydroxy group via a condensation reaction is shown. In FIG. 4, the provision of silica gel is initially shown, which may be situated on core 12, or may form core 12. In a reaction step, by adding a polyether having a terminal hydroxy group, a condensation reaction may occur in a way known per se, whereby the polyether is bonded via an Si—O—C bond to the silica gel core. It is therefore apparent that, for example, by choosing the polymer, the sorption properties of the sorption agent may be tailor-made with respect to the active material or its intermediate stages.

What is claimed is:

1. An electrode for an energy store, comprising:
   an active material provided with a binder and a conductive additive; and
   a sorption agent distinct from the active material, the binder and the conductive additive, wherein intermediate stages of the active material arising during at least one of a charging procedure and a discharging procedure of the energy store are immobilized by the sorption agent, and wherein the sorption agent has a multi-ply construction including a core, a carbon layer surrounding the core, and a sorption ply surrounding the carbon layer.

2. The electrode as recited in claim 1, wherein the sorption agent selectively immobilizes polysulfides.

3. The electrode as recited in claim 1, wherein the sorption agent includes a polymer.

4. The electrode as recited in claim 3, wherein the polymer is selected from the group composed of polyethers, for example, polyethylene glycols, polyacrylates, polystyrenes, polyvinyl styrenes, polyvinyl alcohols, polysiloxanes, polyesters, or of derivatives or mixtures of the above-mentioned materials.

5. The electrode as recited in claim 1, wherein the sorption agent includes a core that has a material which is selected from the group composed of silicon dioxide, aluminum dioxide, titanium dioxide, zirconium dioxide, silica gel, magnesium oxide, zinc oxide, or electrically conductive carbon compounds, for example, active carbon or carbon nanotubes, or a mixture of the above-mentioned materials.

6. The electrode as recited in claim 5, wherein the core is porous.

7. The electrode as recited in claim 6, wherein the core has a pore volume in a range from greater than or equal to 0.025 $cm^3/g$ to less than or equal to 3.0 $cm^3/g$.

8. The electrode as recited in claim 1, wherein the energy store includes a lithium-based energy store.

9. An energy store, comprising:
   at least one electrode, comprising:
     an active material provided with a binder and a conductive additive; and
     a sorption agent distinct from the active material, the binder and the conductive additive, wherein intermediate stages of the active material arising during at least one of a charging procedure and a discharging procedure of the energy store are immobilized by the sorption agent, and wherein the sorption agent has a multi-ply construction including a core, a carbon layer surrounding the core, and a sorption ply surrounding the carbon layer.

10. The energy store as recited in claim 9, wherein the energy store includes a lithium-sulfur energy store.

* * * * *